(12) United States Patent
Fujii et al.

(10) Patent No.: US 6,411,344 B2
(45) Date of Patent: Jun. 25, 2002

(54) TRANSPARENT TOUCH PANEL AND LIQUID CRYSTAL DISPLAY DEVICE EQUIPPED WITH TRANSPARENT TOUCH PANEL

(75) Inventors: Sadao Fujii, Kobe; Keizo Asaoka, Otsu; Toshihiko Hikida, Settsu, all of (JP)

(73) Assignee: Kaneka Corporation, Osaka (JP)

(*) Notice: Subject to any disclaimer, the term of this patent is extended or adjusted under 35 U.S.C. 154(b) by 0 days.

(21) Appl. No.: 09/741,286

(22) Filed: Dec. 15, 2000

Related U.S. Application Data (63) Continuation of application No. PCT/JP99/02919, filed on Jun. 1, 1999.

(30) Foreign Application Priority Data

Jun. 18, 1998 (JP) ............................................ 10-171522
Aug. 4, 1998 (JP) ............................................ 10-220340

(51) Int. Cl.⁷ ............................................ G02F 1/1335
(52) U.S. Cl. ........................ 349/12; 349/117; 349/118
(58) Field of Search ........................... 349/12, 117, 118, 349/119, 120

(56) References Cited

U.S. PATENT DOCUMENTS

| | | | |
|---|---|---|---|
| 4,985,285 A | * 1/1991 | Ichikawa et al. | 428/1 |
| 5,039,185 A | * 8/1991 | Uchida et al. | 359/75 |
| 5,396,355 A | * 3/1995 | Wada et al. | 359/73 |
| 5,833,878 A | * 11/1998 | Shinohara | 252/299.01 |
| 5,852,487 A | * 12/1998 | Fujimori et al. | 349/162 |
| 6,008,871 A | * 12/1999 | Okumura | 349/61 |
| 6,016,134 A | * 1/2000 | Ota | 345/104 |
| 6,020,945 A | * 2/2000 | Sawai et al. | 349/119 |
| 6,136,444 A | * 10/2000 | Kon et al. | 428/423.1 |
| 6,204,896 B1 | * 3/2001 | Matsuhira et al. | 349/12 |
| 6,226,064 B1 | * 5/2001 | Shimada et al. | 349/117 |

FOREIGN PATENT DOCUMENTS

| | | | |
|---|---|---|---|
| EP | 0740181 A1 | | 10/1996 |
| EP | 10048625 | | 2/1998 |
| JP | 2-160204 | * | 6/1990 |
| JP | 2-256023 | * | 10/1990 |
| JP | 2-285303 | * | 11/1990 |
| JP | 3-24502 | * | 2/1991 |
| JP | 4-230704 | * | 8/1992 |
| JP | 5-127822 | * | 5/1993 |
| JP | 5-157911 | * | 6/1993 |
| JP | 6-337421 | * | 12/1994 |
| JP | 7-287122 | * | 10/1995 |
| JP | 8-281856 | * | 10/1996 |
| JP | 9-237159 | * | 9/1997 |
| JP | 10-48625 | * | 2/1998 |
| JP | 10-186136 | * | 7/1998 |

* cited by examiner

*Primary Examiner*—William L. Sikes
*Assistant Examiner*—Mike Qi
(74) *Attorney, Agent, or Firm*—Christensen O'Connor Johnson Kindness PLLC (57) ABSTRACT

A transparent touch panel comprises a pair of transparent conductive substrates and a retardation film. A transparent conductive film is formed on at least one surface of each of these substrates and these substrates are arranged such that the transparent conductive films are allowed to face each other. By depressing the substrate, these substrates are brought into mutual contact to perform the position detection. The retardation film is made of an amorphous plastic material, meets the relationship nz>ny and has a retardation (nx−ny)×d falling within a range of between 90 nm and 200 nm, wherein d represents the thickness of the film, nx the maximum refractive index within the plane of the retardation film, ny the refractive index in a direction perpendicular to nx, and nz the refractive index in the thickness direction of the retardation film.

35 Claims, 2 Drawing Sheets

TRANSPARENT TOUCH PANEL AND LIQUID CRYSTAL DISPLAY DEVICE EQUIPPED WITH TRANSPARENT TOUCH PANEL

CROSS-REFERENCE TO RELATED APPLICATIONS

This is a continuation of Application No. PCT/JP99/02919, filed Jun. 1, 1999 which was not published under PCT Article 21(2) in English.

This application is based upon and claims the benefit of priority from the prior Japanese Patent Applications No. 10-171522, filed Jun. 18, 1998; and No. 10-220340, filed Aug. 4, 1998, the entire contents of which are incorporated herein by reference.

BACKGROUND OF THE INVENTION

The present invention relates to a transparent touch panel capable of preventing the visual recognizing capability by the reflection of the external light from being lowered when the transparent touch panel is mounted to a liquid crystal cell, and to a liquid crystal display device equipped with the transparent touch panel.

In recent years, liquid crystal display elements attract attentions as an image display element. The liquid crystal display element is expected to be applied to, for example, a portable data assist notebook, an information terminal, a viewing finder for a video camera and a monitor for a car navigation system. Also, in recent years, desired is an input system in which a transparent touch panel is disposed on a display element for performing the input operation while observing the display screen. Known is a tough panel of a resistance film type. In the conventional tough panel of a resistance film type, a touch panel prepared by using polyethylene terephthalate (PET) film having a transparent conductive film formed thereon and a glass plate having a transparent conductive film formed thereon is superposed on a liquid crystal display element.

On the other hand, with expansion in the use of the touch panel, required are an improved contrast of the display and the function of preventing reflection of the external light. To meet these requirements, it is attempted to make the touch panel and the liquid crystal display device integral. For example, proposed Hin Japanese Patent Disclosure (Kokai) No. 10-48625 is a liquid crystal display device. It is proposed that a touch panel is arranged between a polarizing plate on the display side and a liquid crystal cell, said liquid crystal cell having a liquid crystal material sealed between transparent electrode substrates. Also, a retardation corresponding to ¼ wavelength of the visible light is imparted to the transparent conductive substrate included in the touch panel. Alternatively, a retardation film is bonded to the transparent conductive substrate so as to prevent the internally reflected light produced by incorporation of the touch panel.

It is important for the retardation film to have a uniform retardation because the optical characteristics of the retardation film affect the polarized state of the light. The PET film used in the past as the touch panel is a crystalline plastic film and, thus, is partially crystallized within the film. As a result, the molecules are nonuniformly oriented, leading to a large unevenness in the retardation. It follows that the PET film cannot be used for the purpose described above. Therefore, it is studied to use a film made of an amorphous plastic material such as polycarbonate, polyarylate, polysulfone, polyether sulfone or a modified polyolefin having a norbornene skeleton.

The touch panel using any of these films permits achieving a desired improvement in the characteristics when viewed in a direction perpendicular to the display surface. To be more specific, the contrast is improved and the reflected light is suppressed, compared with the case where the touch panel is combined above the liquid crystal display device, so as to provide a display screen that can be observed very easily. However, if the display surface is observed obliquely during the color display or graduated display, the graduation is inverted compared with the displayed image of the liquid crystal display device before integration of the touch panel. In the extreme case, the monochromatic display is inverted or the color balance of the color display is collapsed so as to bring about practical problems such as deterioration in the quality of the displayed image and the poor viewing angle characteristics of the displayed image.

As a result of an extensive research conducted in an attempt to overcome the above-noted problems, the present inventors have found that a difficulty resides in the optical characteristics of the retardation film used in the touch panel. It has been found that the problems noted above can be solved by using a retardation film whose optical characteristics have been controlled with a higher degree in place of the retardation film obtained by the ordinary uniaxial drawing, leading to the present invention.

BRIEF SUMMARY OF THE INVENTION

According to a first aspect of the present invention, there is provided a transparent touch panel, comprising:

a pair of transparent conductive substrates each having a transparent conductive film formed on at least one surface and arranged such that the transparent conductive films of the transparent conductive substrates are allowed to face each other, the pair of transparent conductive substrates being brought into mutual contact upon depression of the transparent conductive substrate on the upper side so as to perform the position detection; and a retardation film made of an amorphous plastic material, meeting the relationship nz>ny, and having a retardation, which is represented by $(nx-ny) \times d$, falling within a range of between 90 nm and 200 nm, where d represents the thickness of the retardation film, nx represents the maximum refractive index within the plane of the retardation film, ny represents the refractive index in a direction perpendicular to nx, and nz represents the refractive index in a thickness direction of the retardation film.

In another touch panel of the present invention, the photoelasticity coefficient of the retardation film falls within a range of between $5 \times 10^{-13}$ cm$^2$/dyne and $65 \times 10^{-13}$ cm$^2$/dyne.

According to a second aspect of the present invention, there is provided a liquid crystal display device integral with the touch panel of the present invention, comprising a polarizing plate arranged on the side of the display surface, a liquid crystal cell, and the transparent touch panel arranged between the polarizing plate and the liquid crystal cell.

According to a third aspect of the present invention, there is provided a liquid crystal display device integral with the touch panel of the present invention, comprising a polarizing plate, a first retardation film, a touch panel, a second retardation film and a liquid crystal cell, which are arranged in the order mentioned, wherein, the touch panel is a resistance film type transparent touch panel, the retardation value represented by $(nx-ny) \times d$ falls within a range of between 90 nm and 200 nm, where nx represents the refractive index in the direction of the slow axis (maximum refractive index) within the planes of the first and second retardation films, ny represents the refractive index in a direction perpendicular to the slow axis, nz represents the refractive index in the thickness direction of the retardation films, and d represents the thickness of the first and second retardation films, and at least one of the first and second retardation films meets the relationship nz>ny.

In the liquid crystal display device integral with the touch panel of the present invention, the first retardation film meets the relationship nz≦ny and the second retardation film meets the relationship nz>ny.

Also, in the liquid crystal display device integral with the touch panel of the present invention, the first and second retardation films are arranged such that the nx directions of these retardation films are substantially perpendicular to each other.

Further, in the liquid crystal display device integral with the touch panel of the present invention, the first retardation film is made of a resin having a photoelasticity coefficient falling within a range of between $5 \times 10^{-13}$ cm$^2$/dyne and $65 \times 10^{-13}$ cm$^2$/dyne.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Known amorphous transparent plastic materials can be used in the present invention as a plastic material forming a transparent film made of an amorphous plastic material. Preferred materials include, for example, bisphenols having an alkylidene group such as bisphenol A as a bisphenol component as well as polycarbonate series plastic materials, polyester carbonate series plastic materials and polyarylate series plastic materials each having bisphenol having a substituted or unsubstituted cycloalkylidene group. It is also possible to use preferably polysulfone, polyether sulfone and norbornene series resins disclosed in Japanese Patent Disclosure No. 07-287122. Concerning the heat resistance of these plastic materials, it is generally desirable for the glass transition temperature of these plastic materials to be not lower than 80° C., preferably to be not lower than 120° C., more preferably to be not lower than 140° C., and most preferably to be not lower than 160° C.

The film used in the present invention can be prepared by the known film forming methods such as a melt extruding method and a solvent casting method. It is desirable to employ the solvent casting method because it is possible to obtain a film having a smooth surface and small in unevenness in the thickness and in the retardation. In the case of employing the solvent casting method, it is possible to obtain a film having a surface roughness (Ra value) not larger than 100 nm and an unevenness in thickness which is not larger than 5% of the average film thickness.

It is necessary for the retardation film used in the transparent touch panel of the present invention to meet the relationship nz>ny, where ny represents the refractive index in a direction perpendicular to nx, which is the maximum refractive index within the film plane, and nz represents the refractive index in the thickness direction of the film. The dependence of the displayed image quality on the viewing angle is derived from the fact that the retardation of the film represented by the product between the birefringence (nx−ny) and the thickness d of the film is changed depending on the viewing angle. The dependence on the viewing angle can be diminished by meeting the relationship nz>ny in at least one retardation film.

The preferred relationship among nz, ny and nz differs depending on the relative arrangement between the retardation film and the touch panel of the liquid crystal cell, making it necessary to determine appropriately by experience the preferred relationship. In the case of using only one retardation film, it is desirable to select the values of nx, ny and nz to permit the value of nz, which is represented by (nx−nz)/(nx−ny), to fall within a range of between 0.9 and 0.1, preferably within a range of between 0.8 and 0.2, and more preferably within a range of between 0.7 and 0.3. By selecting the values of nx, ny and nz to fall within the range noted above, it is possible to permit the ratio of the retardation Rx(40) or Ry(40) measured in a direction inclined by 40° in a direction of nx or ny to the retardation (R(0)) measured in the direction perpendicular to the film surface, i.e., Rx(40)/R(0) or Ry(40)/R(0), to fall within a range of between 1.08 and 0.90, preferably between 1.05 and 0.95, and 1.03 and 0.96.

It is desirable for the retardation R(0) to be ¼ wavelength relative to the wavelength of the visible light. In general, the retardation R(0) falls within a range of between 90 nm and 200 nm, preferably not shorter than 110 nm and not longer than 160 nm. In this case, it is desirable for R(0) to be ¼ wavelength for each wavelength of the visible light. It is desirable for the retardation film to be formed of an olefinic plastic material such as a norbornene series resin.

In the case of using two retardation films, the preferred relationship among nx, ny and nz of one retardation film having a relationship nz>ny differs depending on the optical characteristics of said one retardation film and the other retardation film and the relative arrangement between the liquid crystal cell and the touch panel, making it necessary to determine appropriately by experience the preferred relationship among nx, ny and nz of one retardation film having a relationship nz>ny. Where said one retardation film is formed of a retardation film prepared by uniaxially stretching a plastic material having positive birefringence properties such as polycarbonate, i.e., where one retardation film has the relationship nz>ny, with the other retardation film having the relationship nz<ny, it is desirable to select the values of nx, ny and nz to permit the Nz value represented by (nx−nz)/(nx−ny) to fall within a range of between −0.9 and 0.8, preferably between −0.7 and 0.4, and more preferably between −0.5 and 0.3. Where each of the two retardation films meets the relationship nz>ny, it is desirable for the Nz value to fall within a range of between 0.9 and 0.1, preferably between 0.8 and 0.2, and more preferably between 0.7 and 0.3. By selecting the values of nx, ny and nz to permit the Nz value to fall within the range noted above, it is possible to diminish the dependence of the retardation value on the viewing angle generated from the first retardation film and the second retardation film.

To be more specific, if the retardation values of the first and second retardation films are equal to each other in the case where the first retardation film and the second retardation film are arranged such that the slow axis direction (nx) within the film plane for the first retardation film is substantially perpendicular to the slow axis direction (nx) within the film plane for the second retardation film, the resultant retardation value is zero. However, if the retardation value is measured in a direction inclined from the direction perpendicular to the display surface, the retardation value is greatly increased to reach 30 nm or more in the case of using the conventional retardation film, giving rise to inconveniences in the displayed image such as inversion of the color tone and collapse of the color balance. On the other hand, in the case of using a retardation film meeting the relationship nz>ny as at least one of the retardation films, it is possible to suppress markedly the increase in the resultant retardation value by selecting an appropriate value.

As disclosed in, for example, Japanese Patent Disclosure No. 2-160204, Japanese Patent Disclosure No. 5-157911 and Japanese Patent Disclosure No. 4-230704, the particular retardation film can be manufactured by the known method by orienting the molecules in a predetermined direction. Also, the retardation film used in the present invention can be easily obtained by stretching a film made of a material having negative birefringence properties such as polystyrene, as disclosed in Japanese Patent Disclosure No. 2-256023.

The first retardation film is used integral with the polarizing plate. In some cases, strain under stress is applied to the film constituting the touch film because of deformation of the polarizing plate under the environment of the use. The birefringence of the film is changed by the strain under stress so as to be deviated from a preferred range. Also, an unevenness in the retardation is generated within the plane so as to markedly degrade the displayed image quality. Under the circumstances, it is desirable to use a material whose birefringence is unlikely to be changed by the stress. On the other hand, where a retardation is imparted to the film, the material in which the birefringence tends to be developed to some extent is adapted for the processing because the molecules are easily oriented by stress. In general, it is desirable to use a film made of a plastic material having a photoelasticity coefficient falling within a range of between $5 \times 10^{-13}$ $cm^2/dyne$ and $65 \times 10^{-13}$ $cm^2/dyne$, preferably between $10 \times 10^{-13}$ $cm^2/dyne$ and $65 \times 10^{-13}$ $cm^2/dyne$.

As described above, a stretched film made of a plastic material such as polycarbonate, polyarylate, polysulfone or polyether sulfone or a known amorphous plastic material such as a modified polyolefin, or a norbornene series plastic material can be used as a preferred retardation film used in the present invention. In terms of the unevenness in the retardation derived from the deformation of the polarizing plate described previously and the workability, particularly preferred plastic materials are polyarylate, polycarbonate and polyester carbonate having a bisphenol component having substituted or unsubstituted cycloalkylidene group or an alkylidene group having at least 5 carbon atoms. To be more specific, plastic materials used preferably in the present invention include, for example, polycarbonate, polyarylate and polyester carbonate having 1,1-bis (4-hydroxyphenyl)-cyclohexane, 1,1-bis (4-hydroxyphenyl)-3,3,5-trimethyl cyclohexane, 3,3-bis (4-hydroxyphenyl)-pentane, or 4,4-bis (4-hydroxyphenyl)-heptane as a bisphenol component.

The present invention will now be described with reference to the accompanying drawings.

Figure 1:
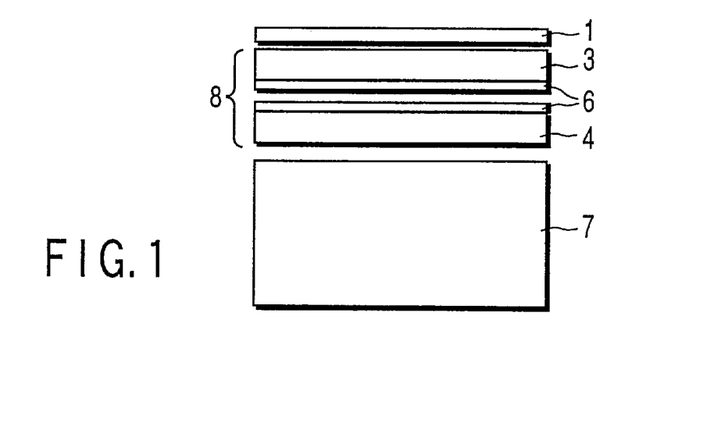
FIG. 1 is a cross sectional view showing a liquid crystal display device equipped with a first transparent touch panel of the present invention.
Figure 2:
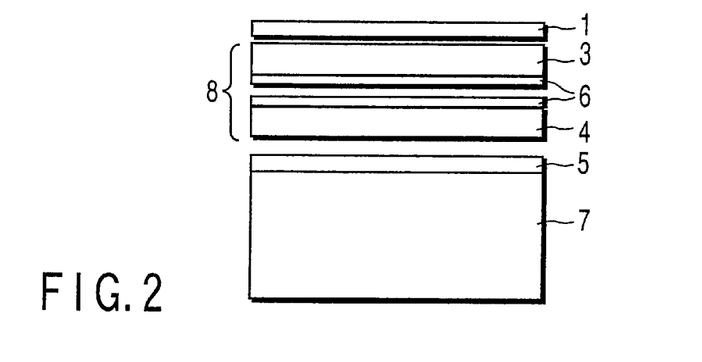
FIG. 2 is a cross sectional view showing a liquid crystal display device equipped with a second transparent touch panel of the present invention.

As shown in FIGS. 1 and 2, a touch panel 8 of the present invention comprises a first transparent conductive substrate 3 made complex with a retardation film and having a transparent conductive film 6 formed on one surface and a second transparent conductive substrate 6 having another transparent conductive film 6 formed on one surface. These first and second transparent conductive substrates 3 and 6 are arranged such that the transparent conductive films 6 are allowed to face each other. It is possible for the first transparent conductive substrate 3 to be prepared by forming a transparent conductive film on a retardation film. The second transparent conductive substrate 4 is prepared by forming a transparent conductive film on, generally, a glass substrate, which does not exhibits a birefringence, in view of the construction that the second transparent conductive substrate 4 is incorporated in a polarizing plate. Alternatively, the second transparent conductive substrate 4 can be prepared by attaching an additional retardation film referred to hereinlater to the glass substrate or by forming a transparent conductive film directly on a retardation film.

In order to impart the function of a touch panel, a spacer, an electrode, an insulating film, etc. are formed on each of the two transparent conductive substrates. The touch panel of the particular construction is arranged between a polarizing plate 1 on the display side of a liquid crystal display device and a liquid crystal cell 7 such that the angle between the absorption axis of the polarizing plate and the nx direction of the retardation film is substantially 45° and the retardation film is in contact with the polarizing plate 1. Needless to say, the retardation film is bonded to the polarizing plate 1 with an adhesive having a suitable refractive index so as to suppress the light reflection.

In a liquid crystal display device, a retardation film or a compensating film for increasing the viewing angle are arranged in some cases between the polarizing plate 1 on the display side and the liquid crystal cell 7 in order to improve the display quality. Where the touch panel of the present invention is made integral with such a liquid crystal display device, it is necessary to determine the relative arrangement so as not to impair the optical function. Also, it is possible to arrange a polarizing plate between the touch panel 8 and the liquid crystal cell 7.

It is desirable to apply an antireflection treatment to that surface of the polarizing plate 1 which is attached to a transparent touch panel so as to further decrease the reflection of the external light.

It should be noted that a retardation film is arranged inside the polarizing plate 1 in the present invention, with the result that the transmitted light is colored by the retardation. In order to prevent the coloring phenomenon and to ensure satisfactory display characteristics, it is desirable to arrange an additional retardation film 5 on the lower side of the touch panel, as shown in FIG. 2 directed to a second embodiment of the present invention. It is particularly desirable for the retardation film 5 to be formed of a material equal to the material of the retardation film incorporated in the touch panel 8. It is also desirable for the retardations of these two retardation films to be substantially equal to each other. It is desirable for the second retardation film 5 for color compensation to be arranged on the liquid crystal display cell 7 below the touch panel 8. However, it is possible for the second retardation film 5 to be bonded to the lower transparent conductive substrate 4 included in the touch panel 8. Needless to say, it is also desirable for the touch panel 8 to be bonded to the second retardation film 5 with an adhesive having a suitable refractive index so as to suppress the light reflection. In general, the retardation film 5 for color compensation is arranged such that the nx direction of the retardation film 5 is substantially perpendicular to the nx direction of the retardation film included in the touch panel 8. However, the retardation film 5 may be arranged such that the nx direction of the retardation film 5 is equal to the nx direction of the retardation film included in the touch panel 8. Where the retardation film 5 is arranged such that the nx direction of the retardation film 5 is equal to the nx direction of the retardation film included in the touch panel 8, the polarizing plate 1 on the side of the display surface is arranged 90° deviant from the angle of the absorption axis of the original polarizing plate.

Of course, it is desirable for all the retardation films included in the arrangement described above to be formed of the retardation film specified in the present invention. However, it is possible to use an ordinary retardation film having nz smaller than ny, which does not fall within the technical scope of the present invention, as at least one of the retardation films. Where each of the two retardation films meets the relationship nz>ny, it is desirable for the Nz value to fall within a range of between 0.9 and 0.1, preferably between 0.8 and 0.2, and more preferably between 0.7 and 0.3. Where only one of the two retardation films meets the relationship nz>ny, it is desirable for the Nz value to fall within a range of between −0.9 and 0.8, preferably between −0.7 and 0.4, and more preferably between −0.5 and 0.3.

In the transparent touch panel 8 of the present invention, it is desirable for the transparent conductive substrate 3 on the upper side corresponding to the side of the display surface to be formed of a retardation film of the present invention. In forming the transparent conductive film 6 on the retardation film of the present invention, it is desirable to form a coating layer in a thickness of 0.1 to 10 µm, preferably in a thickness of 1 to 5 µm, on that surface of the retardation film on which the transparent conductive film is formed in order to improve the adhesive force or mechanical strength between the transparent conductive film 6 and the retardation film. The preferred coating layer is formed of, for example, an organic coating material such as a melamine resin, an acrylic resin, an urethane resin, an alkyd resin, and a fluorine-containing resin. It is also possible to use an organic-silicone complex material for forming the coating layer. The complex material is prepared by mixing, for example, a partially hydrolyzed material of alkyl tri-alkoxy silane or tetra-alkoxy silane with polyester polyol or etherized methylol melamine. It is also possible to use suitably partially hydrolyzed material of amino silane or epoxy silane, a mixture of a silane coupling agent and a partially hydrolyzed material of alkyl tri-alkoxy silane or tetra-alkoxy silane, and a mixture of colloidal silica and alkyl tri-alkoxy silane. It is possible to obtain a film having a solvent resistant layer by coating one surface or both surfaces of the transparent film of the present invention with these materials, followed by thermally curing the coating. In this case, it is desirable to use a low temperature thermosetting type catalyst because the catalyst serves to suppress the undesirable thermal damage of the film. It is also possible to use suitably a cured layer prepared by adding a photosensitizer to a monomer or oligomer such as a polyfunctional acrylate, followed by irradiating the mixture with an ultraviolet light or an electron beam.

It is possible to add various fillers to the coating layer, as desired. The filler addition permits preventing generation of undesirable Newton's rings caused by interference of light between the transparent electrodes and also permits preventing blocking between the transparent conductive substrates. The preferred fillers used in the present invention include organic fillers such as polymethacrylic acid esters, polyacrylic acid esters, polyolefins, polystyrene, divinyl benzene, benzoguanamine and organic silicones and inorganic fillers such as silica, alumina, and titanium oxide. On the other hand, the filler addition imparts in some cases a garish impression to the displayed image, making it necessary to keep the clarity of the transmitted image at 80% or more by optimizing the filler shape, and the coating conditions of the coating agent.

Figure 3:
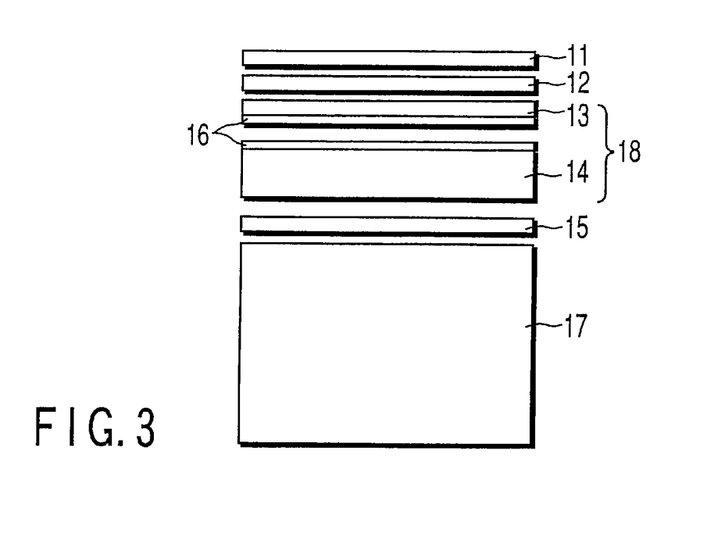
FIG. 3 is a cross sectional view showing a liquid crystal display device equipped with a third transparent touch panel of the present invention.
Figure 4:
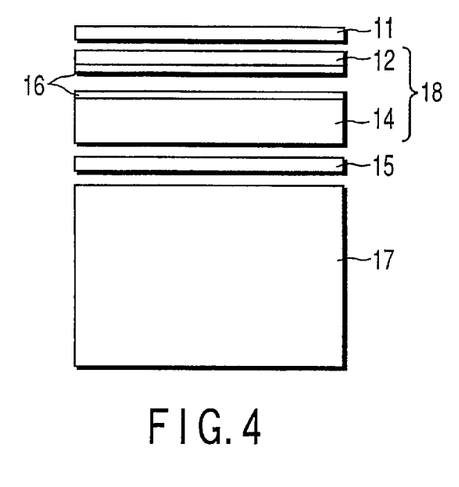
FIG. 4 is a cross sectional view showing a liquid crystal display device equipped with a fourth transparent touch panel of the present invention.

In the liquid crystal display apparatus of the present invention, a polarizing plate 11, a first retardation film 12, a touch panel 18, a second retardation film 15 and a liquid crystal cell 17 are arranged in the order mentioned starting with the display surface, as shown in FIG. 3. The polarizing plate 11 on the display side is arranged such that the polarizing axis of the polarizing plate 11 forms an angle of substantially 45° with the nx direction of the first retardation film 12. The resistance film type touch panel 18 used in the present invention comprises two transparent conductive substrates 13 and 14 each having a transparent conductive film 16 formed on at least one surface. These two transparent conductive substrates 13 and 14 are arranged to permit the transparent conductive films 16 to face each other. If the transparent conductive substrate 13 on the upper side is depressed, the two conductive substrates 13 and 14 are brought into mutual contact so as to detect the position. In other words, the resistance film type touch panel 18 is formed by arranging the first transparent conductive substrate 13 and the second transparent conductive substrate 14 in a manner to permit the transparent conductive films 16 to face each other. A spacer, an electrode, an insulating resin film, etc. are formed to permit the two transparent conductive substrates 13 and 14 to perform the function of the touch panel 18. The first transparent conductive substrate 13 can be prepared by forming the transparent conductive layer 16 on an optically isotropic film. Also, it is possible for the first transparent conductive substrate 13 to be made complex with the first retardation film 12. It is particularly desirable to prepare the first transparent conductive substrate 13 by forming the transparent conductive film 16 on the first retardation film 12, as shown in FIG. 4. The particular construction permits decreasing the thickness of the film on the input side of the touch panel, i.e., on the side of the display surface, making it possible to maintain a small pushing force required for the touch input so as to facilitate the input. The second transparent conductive substrate 14 is formed of an optically isotropic material and can be prepared in general by forming the transparent conductive film 16 on a glass substrate. The second transparent conductive substrate 14 can be attached to the second retardation film 15. Alternatively, the transparent conductive film 16 can be formed directly on the second retardation film 15 for preparing the second transparent conductive substrate 14. It is desirable for the second retardation film 15 to be arranged on the liquid crystal cell 17 below the touch panel 18, though it is possible to attach the second retardation panel 15 to the second transparent conductive substrate 14 on the lower side, which is included in the touch panel 18. The second retardation film 15 is arranged such that the nx direction of the second retardation film 15 is substantially parallel or perpendicular to the nx direction of the first retardation film 12.

Figure 5:
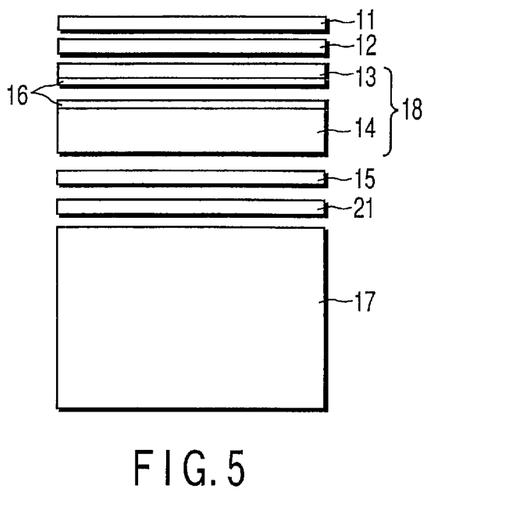
FIG. 5 is a cross sectional view showing a liquid crystal display device equipped with a fifth transparent touch panel of the present invention.

In this case, it is possible for the liquid crystal cell 17 positioned adjacent to the second retardation film 15 to have a polarizing plate 21 on the electrode substrate constituting the liquid crystal cell 17, as shown in FIG. 5. The polarizing plate 11 arranged on the side of the display surface also performs the function of the polarizing plate on the side of the display surface of the liquid crystal display device. Therefore, it is necessary to arrange the polarizing plate 11 with attentions paid to the angle of the polarizing axis of the polarizing plate 11 relative to the liquid crystal display device. Where the retardation plates 12 and 15 are arranged such that the nx directions of these retardation plates 12 and 15 are perpendicular to each other, it is desirable to arrange the polarizing axis of the polarizing plate 11 on the side of the display surface in a direction equal to the direction of the polarizing axis of the polarizing plate arranged in advance on the side of the display surface of the liquid crystal display device. On the other hand, where the retardation films 12 and 15 are arranged such that the nx directions are substantially equal to each other, it is desirable arrange the polarizing plate 11 on the side of the display surface such that the polarizing axis of the polarizing plate 11 is substantially perpendicular to the polarizing axis of the polarizing plate arranged in advance on the side of the display surface of the liquid crystal display device.

It is desirable to further decrease the reflection of the external light by applying an antireflection treatment to the surface of the polarizing plate 11 on the side of the display surface.

It is possible to use the known liquid crystal display device such as the twisted nematic (TN) type and the super twisted nematic (STN) type in the liquid crystal display device of the present invention. In the case of the STN type, a retardation film for color compensation is arranged in many cases between the polarizing plate 11 on the side of the display surface and the electrode substrate included in the liquid crystal cell 17. In this case, it is desirable for the retardation film for color compensation to be arranged between the second retardation film 15 and the liquid crystal cell 17 included in the liquid crystal display device of the present invention.

Further, in the liquid crystal display device of the present invention, it is possible to arrange known other elements performing the function of improving the quality of the display image between the polarizing plate 11 on the side of the display surface and the liquid crystal display device in order to improve the viewing angle, the brightness, etc. of the liquid crystal display device in addition to the touch panel 18 and the retardation films 12, 15 included in the liquid crystal display device of the present invention.

In a more preferred embodiment of the present invention, the first retardation film 12 meets the condition of $nz \leq ny$, and the second retardation film meets the condition of $nz > ny$ in the arrangement shown in FIG. 4. In this case, the first retardation film 12 can be obtained by uniaxially drawing a plastic film that can be suitably used as the retardation film by a known method.

As already pointed out, it is particularly desirable to use the first retardation film 12 having the transparent conductive layer 16 formed thereon as the first transparent conductive substrate 13 of the touch panel 18 because the particular construction permits facilitating the input of the touch panel. In general, a heating step is employed in the transparent conductive processing and in the process of preparing the touch panel, making it necessary for the film substrate used to exhibit resistance to heat. Particularly, in the case of using a drawn film like the retardation film, the retardation value is changed by the heating during the processing. It follows that it is desirable to use a film having a higher resistance to heat as the retardation film among the preferred materials described previously. To be more specific, it is desirable to use a film having a glass transition temperature of at least 160° C., more preferably at least 180° C. The specific materials meeting the particular requirement include, for example, polyarylate, polysulfone, polyether sulfone, and polycarbonate containing at least 30 mol percent of 1,1-bis (4-hydroxyphenyl)-3,3,5-trimethyl cyclohexane as the bisphenol component.

On the other hand, if the heat resistance is increased as noted above, it is difficult to apply industrially a special molecule orienting treatment meeting the condition of $nz > ny$ so as to make it difficult to obtain a retardation film exhibiting desired optical characteristics, though a retardation film meeting the condition of $nz \leq ny$ can be manufactured by the ordinary uniaxial drawing without bringing about a problem. Therefore, it is possible to obtain easily a liquid crystal display device performing a desired function by using a heat resistant retardation film meeting the condition of $nz \leq ny$ as the first retardation film incorporated in the touch panel 18 and by using a retardation film meeting the condition of $nz > ny$ as the second retardation film arranged on the back surface of the touch panel 18.

EXAMPLES

The measuring methods of various properties described in Examples 1–8, Comparative Examples 1–2, and Reference Example 1 will now be described.

<Refractive Index>

A sample was disposed horizontally on a stage by using a polarized microspectrophotmeter manufactured by Oak Seisakusho K.K. so as to measure the retardation (R(0)). Then, the sample was inclined by 40° in the direction of the optical axis (nx direction) so as to measure similarly the retardation (Rx(40)). The values of nx, ny, nz were calculated by using the measured values and an average refractive index (n).

<Photoelasticity coefficient>

The retardation of a film cut in strips each having a width of 1 cm in the direction of the optical axis was measured by using a micropolarizing apparatus. Further, the retardation was measured by applying a load of 50 g, 100 g, and 150 g to one end of the strip with the other end fixed, and the amount of change in the birefringence per unit stress was calculated in view of the cross sectional area of the strip of the film.

<Clarity of Transmitted Image>

The clarity of the transmitted image was measured in accordance with the method specified in JIS (Japanese Industrial Standards) K7105-1981.

<Light Ray Transmittance>

The light ray transmittance was measured by using a light having a wavelength of 550 nm in accordance with the method defined in ASTM E275-67.

<Haze>

The haze was measured in accordance with the method specified in JIS K105-1981.

Example 1

A film made of polycarbonate comprising 1,1-bis (4-hydroxyphenyl)-3,3,5-trimethyl cyclohexane, bisphenol A (molar ratio of 4:6) and phosgene was coated with an epoxy acrylic ultraviolet curable coating solution having divinylbenzene series fillers having an average particle diameter of 2 $\mu$m dispersed therein, followed by curing the coating so as to obtain a hard coat layer having a thickness of about 2 $\mu$m. The polycarbonate had a molecular weight of $\eta$SP/C=0.85 (32° C., 0.32 g/dl in chloroform) and a glass transition temperature of 180° C. (DSC). The film was 60 $\mu$m thick, had R(0) of 139 nm, Rx(40) of 138 nm, Rx of 0.99 (n=1.572, nx=1.5732, ny=1.5709, nz=1.5719) and a photoelasticity coefficient of $62 \times 10^{-13}$ $cm^2$/dyne. An ITO film was formed on the hard coat layer by a sputtering method so as to prepare a retardation film having a transparent conductive layer having a surface resistivity of 400 $\Omega$/□.

The clarity of the transmitted image of the substrate measured by using a slit of 0.25 mm was found to be 85%, the light ray transmittance measured by using a light having a wavelength of 550 nm was 87%, and the haze was found to be 0.8%.

A silver electrode was printed in an edge portion of the retardation film equipped with the transparent conductive film, and a transparent conductive glass plate having spacers formed at a pitch of 5 mm and a silver electrode printed thereon, which was prepared separately, was bonded to the retardation film such that the conductive films were allowed to face each other. The bonding was performed by coating an insulating adhesive in the peripheral portion of each of the retardation film and the glass plate, thereby preparing a transparent touch panel.

An additional retardation film for compensation prepared by the process equal to the process of preparing the retardation film used in the touch panel was bonded to that surface of the transparent touch panel thus prepared which is opposite to the conductive film of the transparent conductive glass plate included in the touch panel. These touch panel and the retardation film for compensation were arranged such that the optical axes of the retardation film of the touch panel and the retardation film for compensation (nx direction of the retardation film) were +45° and −45°, respectively ("+" representing the clockwise direction as viewed from the display side).

The retardations were measured in a vertical direction and a direction 40° deviant from the vertical direction by using the touch panel having the retardation films made integral. The retardation was found to be 1 nm in the vertical direction and the measured value R'(40) in a direction 40° deviant from the vertical direction was found to be 4 nm. Therefore, the dependence of the retardation on the viewing angle was small.

Also, the touch panel thus prepared was incorporated in a TFT color TN liquid crystal device equipped with a back light. The resultant device was compared with a TFT color TN liquid crystal device in which the touch panel was not incorporated in respect of the viewing angle characteristics of the displayed image. No difference was recognized between the two.

Comparative Example 1

A liquid crystal display device integral with a transparent touch panel was prepared as in Example 1 by using the polycarbonate used in Example 1, except that a film (R(0)= 140 nm, Rx(40)=125 nm, Rx=0.89, n=1.572, nx=1.5736, ny=1.5713, nz=1.5711) obtained by uniaxially drawing a free end of a film obtained by a solvent casting method was used as the retardation film.

The retardations of the touch panel were measured in a vertical direction and in a direction 40° deviant from the vertical direction. The retardation measured in the vertical direction was found to be 2 nm. On the other hand, the measured value R'(40) measured in a direction 40° deviant from the vertical direction was as large as 32 nm.

The liquid crystal display device having the touch panel incorporated therein was small in the viewing angle at which the color balance was collapsed, compared with the device in which the touch panel was not incorporated.

Example 2

A touch panel was assembled as in Example 1 by using a film made of polycarbonate containing bisphenol A as the bisphenol component and having a glass transition temperature of 149° C., a thickness of 60 $\mu$m, R(0)=139 nm, Rx(40)=138 nm and Rx=0.99. The photoelasticity coefficient of the film was $72 \times 10^{-13}$ $cm^2$/dyne, n=1.586, nx=1.5872, ny=1.5849, nz=1.5859.

The retardations of the touch panel were measured in a vertical direction and in a direction 40° deviant from the vertical direction. The retardation in the vertical direction was found to be 2 nm and the measured value R'(40) in a direction 40° deviant from the vertical direction was found to be 5 nm.

Examples 3–7 and Comparative Example 2

Touch panels were prepared as in Example 1 by using films differing from each other in the values of nx, ny, and nz, and the viewing angle characteristics of the touch panels were measured, with the results as shown in Table 1. The resin used in Examples 3–7 and Comparative Example 2 was equal to that used in Example 1. Therefore, the photoelasticity coefficient was $62 \times 10^{-13}$ $cm^2$/dyne.

TABLE 1

| Example | n | nx | ny | nz | R (0) nm | Rx (40) nm | Rx | Nz | R' (40) nm |
|---|---|---|---|---|---|---|---|---|---|
| 3 | 1.572 | 1.5730 | 1.5707 | 1.5723 | 141 | 147 | 1.04 | 0.27 | 11 |
| 4 | 1.572 | 1.5731 | 1.5708 | 1.5721 | 138 | 140 | 1.01 | 0.44 | 4 |
| 5 | 1.572 | 1.5734 | 1.5711 | 1.5715 | 138 | 131 | 0.95 | 0.79 | 14 |
| 6 | 1.572 | 1.5735 | 1.5711 | 1.5714 | 141 | 131 | 0.93 | 0.92 | 21 |

TABLE 1-continued

| Example | n | nx | ny | nz | R (0) nm | Rx (40) nm | Rx | Nz | R' (40) nm |
|---|---|---|---|---|---|---|---|---|---|
| 7 | 1.572 | 1.5728 | 1.5705 | 1.5727 | 140 | 152 | 1.09 | 0.03 | 23 |
| Comparative Example 2 | 1.572 | 1.5727 | 1.5704 | 1.5729 | 138 | 153 | 1.11 | −0.09 | 29 |

Example 8

A touch panel was assembled as in Example 1 by using a film having a thickness of 100 μm and made of a isobutene-N-methyl maleimide copolymer containing 50 mol % of N-methyl maleimide and having a glass transition temperature of 157° C., said film having R(0) of 137 nm, Rx(40) of 138 nm and Rx of 1.01 (n=1.54, nx=1.5407, ny=1.5393, nz=1.5400).

The retardations of the touch panel were measured in a vertical direction and in a direction 40° deviant from the vertical direction. The retardation in the vertical direction was found to be 2 nm and the retardation value R'(40) in a direction 40° deviant from the vertical direction was found to be 5 nm.

Reference Example

The touch panel obtained in each of Examples 1 and 2 was made integral with a liquid crystal display device and left to stand for 250 hours under a hot and humid environment of 60° C. and 90% RH. The unevenness in the initial retardation was found to be not larger than 5 nm in each of these panels. However, the unevenness in the retardation was increased in the touch panel for Example 2 such that the unevenness in the retardation in a plane was increased to 20 nm.

On the other hand, the unevenness in the retardation was 10 nm in the touch panel for Example 1, supporting that the retardation was relatively stable under the hot and humid environment.

The measuring method of the properties for Examples 9 to 10 and Reference Example 2 will now be described.

<Refractive Index>

A sample was disposed horizontally on a stage by using a polarized microspectrophotmeter manufactured by Oak Seisakusho K.K. so as to measure the retardation (R(0)) by using a light having a measuring wavelength of 515 nm. Then, the sample was inclined by 40° in the ny direction so as to measure similarly the retardation (Ry(40)). Also, a ratio of the retardation was measured by Ry=Ry(40)/R(0). The values of nx, ny, nz were calculated by using the measured values and an average refractive index (n).

<Photoelasticity coefficient>

The retardation of a film cut in strips each having a width of 1 cm in the direction of the optical axis was measured by using a micropolarizing apparatus. Further, the retardation was measured by applying a load of 50 g, 100 g, and 150 g to one end of the strip with the other end fixed, and the amount of change in the birefringence per unit stress was calculated in view of the cross sectional area of the strip of the film.

Example 9

A film made of polycarbonate comprising 1,1-bis (4-hydroxyphenyl)-3,3,5-trimethyl cyclohexane, bisphenol A (molar ratio of 7:3) and phosgene was coated with an epoxy acrylic ultraviolet curable coating solution having divinylbenzene series fillers having an average particle diameter of 2 μm dispersed therein, followed by curing the coating so as to obtain a hard coat layer having a thickness of about 2 μm. The polycarbonate had a molecular weight of ηSP/C=0.85 (32° C., 0.32 g/dl in chloroform) and a glass transition temperature of 206° C. (DSC). The film was 60 μm thick, had R(0) of 140 nm, Ry(40) of 156 nm, Ry of 1.12 (n=1.565, nx=1.5666, ny=1.5643, nz=1.5641) and a photoelasticity coefficient of $43 \times 10^{-13}$ cm$^2$/dyne. An ITO film was formed on the hard coat layer by a sputtering method so as to prepare a retardation film having a transparent conductive layer having a surface resistivity of 400 Ω/□. The film thus prepared was used as the first retardation film shown in FIG. 4.

A transparent touch panel was assembled by using a glass substrate having a transparent conductive layer having a surface resistivity of 200 Ω/□ formed on the surface as a second transparent conductive substrate.

Also, a retardation film made of polycarbonate containing bisphenol A, having a thickness of 75 μm, R(0) of 141 nm, Ry(40) of 132 nm, Ry of 0.94 (n=1.586, nx=1.5867, ny=1.5848, nz=1.5865), and a photoelasticity coefficient of $74 \times 10^{-13}$ cm$^2$/dyne was used as the second retardation film.

The second retardation film was bonded with an adhesive to the surface of a transparent electrode substrate, which is made of glass, of a TFT type liquid crystal display device equipped with a back light and having the polarizing plate on the side of the display surface removed therefrom, with the nx direction aligned with the direction of 45° relative to the polarizing axis of the polarized film arranged in advance.

On the other hand, a polarizing plate having an antireflection coating applied to the surface was bonded with an adhesive to the first retardation film of a touch panel such that the nx direction of the first retardation film made an angle of 45° with the polarizing axis of the polarizing plate.

Further, the first retardation film and the second retardation film were superposed one upon the other in a manner to cross each other at right angles with spacers interposed therebetween so as to assemble a liquid crystal display device equipped with the touch panel.

Figure 6:
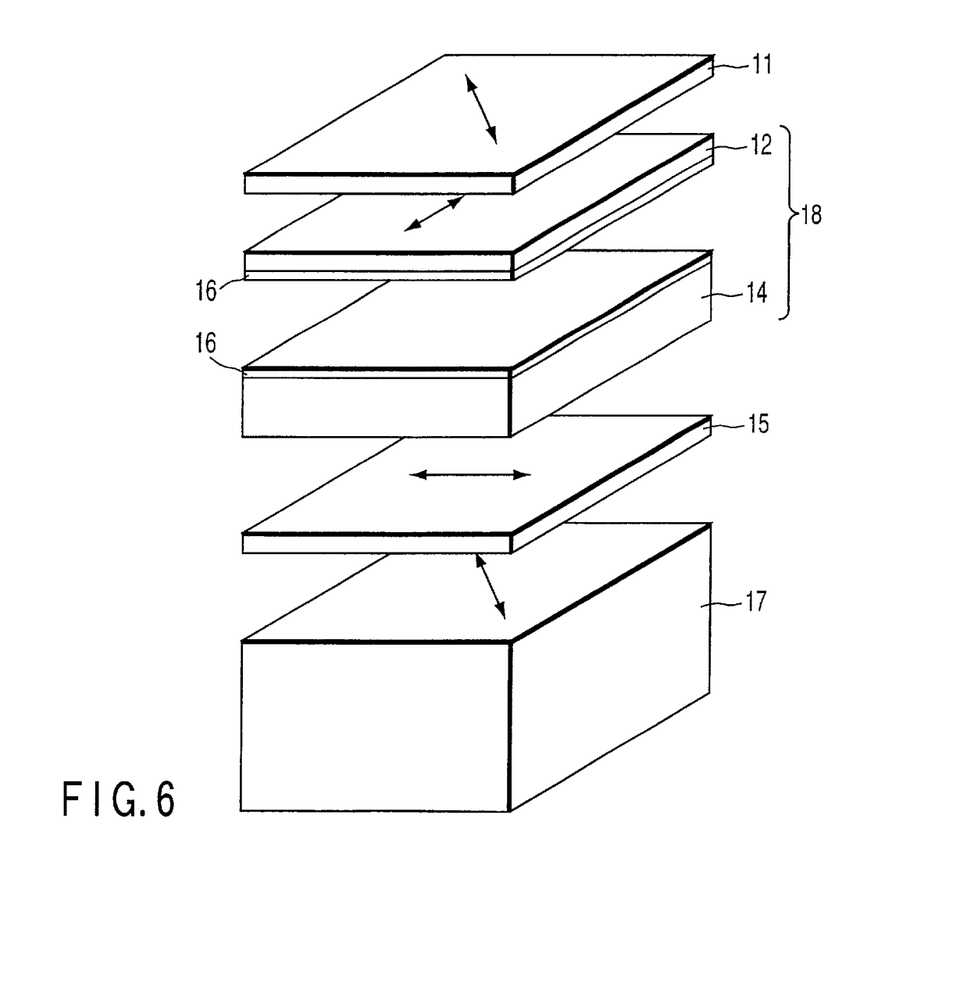
FIG. 6 shows the relative arrangement of the constituents of the liquid crystal display device equipped with a transparent touch panel of the present invention, wherein arrows denote the nx direction of the retardation film or the direction of the polarizing axis of the polarizing plate.

FIG. 6 shows the relative arrangement of the constituents of the liquid crystal display device equipped with the touch panel.

The surface reflectance of the liquid crystal display device thus assembled was not higher than 1%. Where the displayed image was observed with the display surface inclined in a horizontal direction, the graduation inversion was not recognized even if the display surface was inclined by at least 60°.

On the other hand, in the case of using a retardation film having a thickness of 60 μm and made of polycarbonate having R(0) of 137 nm, Ry(40) of 153 nm, and Ry of 1.12 (n=1.586, nx=1.5876, ny=1.5853, nz=1.5850), it was possible to maintain the surface reflectance at 1% or less. However, where the display surface was inclined in the horizontal direction, the graduation inversion was recognized at 45°.

Example 10

A liquid crystal display device equipped with a touch panel was assembled as in Example 9. In Example 10, used was a film having a thickness of 75 μm and prepared by uniaxially drawing AIF75 (trade name of a polyarylate film having a glass transition temperature of 215° C. and manufactured by Kanegafuchi Chemical Industries K.K.). The film had R(0) of 139 nm, Ry(40) of 158 nm and Ry of 1.14 (n=1.597, nx=1.5984, ny=1.5965, nz=1.5961) and a photoelasticity coefficient of $98 \times 10^{-13}$ cm$^2$/dyne. Also used was a second retardation film having a thickness of 75 μm and made of polycarbonate containing bisphenol A. The film had R(0) of 140 nm, Ry(40) of 123 nm and Ry of 0.88 (n=1.586, nx=1.5865, ny=1.5846, nz=1.5869) and a photoelasticity coefficient of $74 \times 10^{-13}$ cm$^2$/dyne.

The surface reflectance of the liquid crystal display device was not higher than 1%. Also, where the displayed image was observed by inclining the displayed image in a horizontal direction of the display surface, the graduation inversion was not recognized even if the surface was inclined by 60° or more.

On the other hand, in the case of using the second retardation film made of polycarbonate and having a thickness of 60 μm, R(0) of 137 nm, Ry(40) of 153 nm and Ry of 1.12 (n=1.586, nx=1.5876, ny=1.5853, nz=1.5850), it was possible to maintain the surface reflectance at 1% or less. However, where the display surface was inclined in the horizontal direction, the graduation inversion was recognized at 45°.

Reference Example 2

The liquid crystal display device prepared in each of Examples 9 and 10 was left to stand for 500 hours under an atmosphere having a relative humidity of 90% and temperature of 60° C. A change in color tone was not recognized in the displayed image in the liquid crystal display device for Example 9. However, a change in the color tone was partially recognized in the displayed image in the liquid crystal display device prepared in Example 10.

The present invention provides a liquid crystal display device integral with a touch panel having a high contrast and exhibiting good display quality over a wide viewing angle.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A transparent touch panel, comprising:
   a pair of transparent conductive substrates each having a transparent conductive film formed on at least one surface and arranged such that the transparent conductive films of the transparent conductive substrates are allowed to face each other, said pair of transparent conductive substrates being brought into mutual contact upon depression of the transparent conductive substrate on the upper side so as to perform the position detection; and
   a retardation film made of an amorphous plastic material, provided outside said transparent conductive films facing each other, meeting the relationship nz>ny, and having a retardation R(0), which is represented by (nx−ny)×d, falling within a range of between 90 nm and 200 nm, where d represents the thickness of said retardation film, nx represents the maximum refractive index within the plane of the retardation film, ny represents the refractive index in a direction perpendicular to nx, and nz represents the refractive index in a thickness direction of the retardation film, the photoelasticity coefficient of the retardation film falling within a range of between $5 \times 10^{-13}$ cm$^2$/dyne and $65 \times 10^{-13}$ cm$^2$/dyne.

2. The transparent touch panel according to claim 1, wherein said one transparent conductive film is formed integral on said retardation film.

3. A liquid crystal display device equipped with the touch panel recited in claim 2, wherein a coating layer is formed on at least that surface of said retardation film on which said transparent conductive film is formed.

4. The liquid crystal display device equipped with a touch panel according to claim 3, wherein a filler is added to said coating layer.

5. A liquid crystal display device equipped with the touch panel recited in claim 1, wherein the glass transition temperature of said retardation film is 80° C. or higher.

6. A liquid crystal display device comprising a transparent touch panel recited in claim 1;
   a polarizing plate arranged on the side of the display surface;
   a liquid crystal cell; and
   said transparent touch panel being arranged between the polarizing plate and the liquid crystal cell.

7. The liquid crystal display device equipped with a touch panel according to claim 6, wherein an antireflection treatment is applied to said polarizing plate.

8. A liquid crystal display device equipped with a touch panel, comprising a polarizing plate, a first retardation film, a touch panel, a second retardation film and a liquid crystal cell, which are arranged in the order mentioned,
   wherein, said touch panel is a resistance film type transparent touch panel,
   the retardation value represented by (nx−ny)×d falls within a range of between 90 nm and 200 nm, where nx represents the refractive index in the direction of the slow axis (maximum refractive index) within the planes of the first and second retardation films, ny represents the refractive index in a direction perpendicular to the slow axis, nz represents the refractive index in the thickness direction of the first and second retardation films, and d represents the thickness of the first and second retardation films,
   the first retardation film meets the relationship nz≦ny, and
   the second retardation film meets the relationship nz>ny.

9. The liquid crystal display device equipped with a touch panel according to claim 8, wherein the first and second retardation films are made of the same material.

10. The liquid crystal display device equipped with a touch panel according to claim 8, wherein a coating layer is formed in at least that surface of said first retardation film on which is formed the transparent conductive film.

11. The liquid crystal display device equipped with a touch panel according to claim 10, wherein a filler is added to said coating layer.

12. The liquid crystal display device equipped with a touch panel according to claim 8, wherein an antireflection treatment is applied to said polarizing plate.

13. The liquid crystal display device equipped with a touch panel according to claim 8, wherein a polarizing plate is arranged between the second retardation film and the liquid crystal cell.

14. The liquid crystal display device equipped with a touch panel according to claim 8, wherein the glass transition temperature of said first and second retardation films is 80° C. or higher.

15. A liquid crystal display device equipped with a touch panel, comprising a polarizing plate, a first retardation film, a touch panel, a second retardation film and a liquid crystal cell, which are arranged in the order mentioned, wherein, said touch panel is a resistance film type transparent touch panel, the retardation value represented by (nx−ny)×d falls within a range of between 90 nm and 200 nm, where nx represents the refractive index in the direction of the slow axis (maximum refractive index) within the planes of the first and second retardation films, ny represents the refractive index in a direction perpendicular to the slow axis, nz represents the refractive index in the thickness direction of the first and second retardation films, and d represents the thickness of the first and second retardation film, the first retardation film meets the relationship nz≦ny, the second retardation film meets the relationship nz>ny, and the first and second retardation films are arranged such that the nx directions of these retardation films are substantially perpendicular to each other.

16. The liquid crystal display device equipped with a touch panel according to claim 15, wherein the first and second retardation films are made of the same material.

17. The liquid crystal display device equipped with a touch panel according to claim 15, wherein a coating layer is formed in at least that surface of said first retardation film on which is formed the transparent conductive film.

18. The liquid crystal display device equipped with a touch panel according to claim 17, wherein a filler is added to said coating layer.

19. The liquid crystal display device equipped with a touch panel according to claim 15, wherein an antireflection treatment is applied to said polarizing plate.

20. The liquid crystal display device equipped with a touch panel according to claim 15, wherein is arranged between the second retardation film and the liquid crystal cell.

21. The liquid crystal display device equipped with a touch panel according to claim 15, wherein the glass transition temperature of said first and second retardation films is 80° C. or higher.

22. A liquid crystal display device equipped with a touch panel, comprising a polarizing plate, a first retardation film, a touch panel, a second retardation film and a liquid crystal cell, which are arranged in the order mentioned, wherein, said touch panel is a resistance film type transparent touch panel, the retardation value represented by (nx−ny)×d falls within a range of between 90 nm and 200 nm, where nx represents the refractive index in the direction of the slow axis (maximum refractive index) within the planes of the first and second retardation films, ny represents the refractive index in a direction perpendicular to the slow axis, nz presents the refractive index in the thickness direction of the first and second retardation films, and d represents the thickness of the first and second retardation films, at least one of the first and second retardation films meets the relationship nz>ny, and the first and second retardation films are arranged such that the nx directions of these retardation films are substantially perpendicular to each other.

23. The liquid crystal display device equipped with a touch panel according to claim 22, wherein the first and second retardation films are made of the same material.

24. The liquid crystal display device equipped with a touch panel according to claim 22, wherein a coating layer is formed in at least that surface of said first retardation film on which is formed the transparent conductive film.

25. The liquid crystal display device equipped with a touch panel according to claim 24, wherein a filler is added to said coating layer.

26. The liquid crystal display device equipped with a touch panel according to claim 22, wherein an antireflection treatment is applied to said polarizing plate.

27. The liquid crystal display device equipped with a touch panel according to claim 22, wherein is arranged between the second retardation film and the liquid crystal cell.

28. The liquid crystal display device equipped with a touch panel according to claim 22, wherein the glass transition temperature of said first and second retardation films is 80° C. or higher.

29. A liquid crystal display device equipped with a touch panel, comprising a polarizing plate, a first retardation film, a touch panel, a second retardation film and a liquid crystal cell, which are arranged in the order mentioned, wherein, said touch panel is a resistance film type transparent touch panel, the retardation value represented by (nx−ny)×d falls within a range of between 90 nm and 200 nm, where nx represents the refractive index in the direction of the slow axis (maximum refractive index) within the planes of the first and second retardation films, ny represents the refractive index in a direction perpendicular to the slow axis, nz represents the refractive index in the thickness direction of the first and second retardation films, and d represents the thickness of the first and second retardation films, at least one of the first and second retardation films meets the relationship nz>ny, and the first retardation film is made of a resin having a photoelasticity coefficient falling within a range of between $5 \times 10^{-13}$ cm$^2$/dyne and $65 \times 10^{-13}$ cm$^2$/dyne.

30. The liquid crystal display device equipped with a touch panel according to claim 29, wherein the first and second retardation films are made of the same material.

31. The liquid crystal display device equipped with a touch panel according to claim 29, wherein a coating layer is formed in at least that surface of said first retardation film on which is formed the transparent conductive film.

32. The liquid crystal display device equipped with a touch panel according to claim 31, wherein a filler is added to said coating layer.

33. The liquid crystal display device equipped with a touch panel according to claim 29, wherein an antireflection treatment is applied to said polarizing plate.

34. The liquid crystal display device equipped with a touch panel according to claim 29, wherein is arranged between the second retardation film and the liquid crystal cell.

35. The liquid crystal display device equipped with a touch panel according to claim 29, wherein the glass transition temperature of said first and second retardation films is 80° C. or higher.

* * * * *

UNITED STATES PATENT AND TRADEMARK OFFICE
CERTIFICATE OF CORRECTION

PATENT NO.     : 6,411,344 B2
DATED          : June 25, 2002
INVENTOR(S)    : S. Fujii et al.

It is certified that error appears in the above-identified patent and that said Letters Patent is hereby corrected as shown below:

<u>Column 17,</u>
Line 43, "wherein is arranged" should read -- wherein a polarizing plate is arranged --

<u>Column 18,</u>
Lines 17 and 59, "wherein is arranged" should read -- wherein a polarizing plate is arranged --

Signed and Sealed this

Ninth Day of September, 2003

JAMES E. ROGAN
*Director of the United States Patent and Trademark Office*